United States Patent

Hiramoto et al.

[11] Patent Number: 6,120,222
[45] Date of Patent: Sep. 19, 2000

[54] MACHINE TOOL

[75] Inventors: Kazuyuki Hiramoto; Naoshi Takayama; Hiromi Hara; Naozumi Tanikawa, all of Yamanashi, Japan

[73] Assignee: Makino Milling Machine, Co., Ltd., Tokyo, Japan

[21] Appl. No.: 08/924,206

[22] Filed: Sep. 5, 1997

[30] Foreign Application Priority Data

Mar. 31, 1997 [JP] Japan .................................. 9-094496

[51] Int. Cl.[7] .................................................. B23Q 11/08
[52] U.S. Cl. .......................................... 409/134; 409/137
[58] Field of Search ................................... 409/134, 137

[56] References Cited

U.S. PATENT DOCUMENTS

| | | |
|---|---|---|
| 2,322,972 | 6/1943 | Rumpf . |
| 4,842,455 | 6/1989 | Winkler et al. ........................ 409/134 |
| 4,932,117 | 6/1990 | Reed et al. ............................ 409/137 |
| 5,178,499 | 1/1993 | Umeda et al. ......................... 409/134 |
| 5,181,898 | 1/1993 | Piotrowski ................................ 483/3 |
| 5,263,800 | 11/1993 | Chen ...................................... 409/137 |
| 5,482,414 | 1/1996 | Hayashi et al. ....................... 409/134 |
| 5,586,848 | 12/1996 | Suwijn .................................. 409/137 |
| 5,611,137 | 3/1997 | Braun ..................................... 409/137 |
| 5,624,363 | 4/1997 | Kuriki ................................... 409/134 |
| 5,704,884 | 1/1998 | Uemura et al. ....................... 409/134 |

FOREIGN PATENT DOCUMENTS

| | | |
|---|---|---|
| 2634255 | 2/1978 | Germany ............................... 409/134 |
| 223970 | 6/1978 | Germany ............................... 409/134 |
| 34 16 429 | 11/1985 | Germany . |
| 58-93437 | 6/1983 | Japan . |
| 61-103754 | 5/1986 | Japan . |
| 61-120448 | 7/1986 | Japan . |
| 62113948 | 7/1987 | Japan . |
| 6-28835 | 3/1988 | Japan . |
| 4-283041 | 10/1992 | Japan . |
| 6-091457 | 4/1994 | Japan . |
| 2 095 141 | 9/1982 | United Kingdom . |

OTHER PUBLICATIONS

Patent Abstract of Japan, vol. 018, No. 354 (M–1632) Jul. 5, 1994 (JP 06–091457 Apr. 5, 1994 Okuma Mach Works Ltd.).

Primary Examiner—Daniel W. Howell
Attorney, Agent, or Firm—McAulay Nissen Goldberg Kiel & Hand, LLP

[57] ABSTRACT

To provide a compact size machine tool free from the inconveniences inherent to the prior art and excellent in the collection and removal of chips or the like, there is provided a channel 39 in a central portion of the bed 3 directly beneath the table 21 and extending parallel to the table moving direction; a chip conveyor 47 being provided inside the channel 39; on both sides with respect to the channel 39, a pair of opposite slopes 51, 51 for collection of chips as well as telescopic covers 53, 53 extensible or contractible in accordance with the displacement of the table 21 being provided so as to cover a pair of guide rails 13, 13 which extend parallel to each other along the Z direction.

25 Claims, 4 Drawing Sheets

MACHINE TOOL

BACKGROUND OF THE INVENTION

1. Field of the Invention

The present invention relates to a machine tool for machining a workpiece with a relative displacement between the workpiece and a tool in three dimensional directions X, Y, and Z.

2. Description of the Related Art

In the field of machine tools, how to effectively remove or discharge a large amount of chips generated during machining is an important problem. Up to now, several companies have carried out research and development regarding this problem.

For examples, chip-removal structures are proposed, in Japanese Examined Patent Publication (Kokoku) No. 6-28835 and Japanese Unexamined Utility Model Publication (Kokai) No. 58-93437, wherein channels are provided on both sides of a table so that chips are separately received into the respective channel. In detail, the former publication discloses a chip-removal structure for a vertical type machining center wherein channels are provided on both sides of a table movable in X/Y directions so that chips are received by the respective channel and discharged outside therefrom by a chip-discharging means provided in the respective channel. The latter discloses a chip-removal structure for a horizontal type machining center wherein channels are provided on both sides of a table movable in Z direction so that chips are received by the respective channel and conveyed outside therefrom by a chip-discharging means by using a fluid provided in the respective channel.

However, according to the above prior art structures, there is a problem that the structure becomes complicated since the channels are separately provided in two locations and need two independent chip-discharging means respectively corresponding thereto. Also, the width of the channel in connection with the total width of the machining center is predetermined. In the prior arts, the channel is split into two separate channels, and the width of each separate channel is identical to one-half the predetermined width, thereby preventing a smooth flow of chips from a workpiece being machined. Consequently, a heap of chips (a nest-like pile of chips) is liable to form in the respective channels. This tendency would be enhanced, as the width of the machining center is reduced leading to a reduction in the width of the channels.

SUMMARY OF THE INVENTION

An essential object of the present invention is to provide a compact size machine tool having a stable and improved chip collection/removal performance without the above-mentioned drawbacks.

According to a first feature of the present invention, there is provided a machine tool, for machining a workpiece by a relative displacement between the workpiece and a tool in the three axial directions X, Y, and Z, comprising: a bed forming a base; a table, on which the workpiece is secured, which is guided and movable on the bed in at least a horizontal direction by a pair of opposed table-guides; a spindle head having a main spindle for mounting the tool, which is relatively movable with respect to the table; a U-shaped chip receiver for chips provided under the table and extending in the table moving direction; and two covers, each of which covers one of the pair of table-guides, for guiding and gathering chips into the chip receiver.

According to a second feature of the present invention, there is provided a machine tool, for machining a workpiece by a relative displacement between the workpiece and a tool in the three axial directions X, Y, and Z, comprising: a bed forming a base; a table, on which the workpiece is secured, which is guided and movable on the bed in at least a horizontal direction by a pair of opposed table-guides; a horizontal type spindle head having a horizontally extending main spindle for mounting the tool, which is relatively movable with respect to the table; a U-shaped chip receiver for chips provided under the table and extending in the table moving direction; two covers, each of which covers one of the pair of table-guides, for guiding and gathering chips into the chip receiver; and a chip discharger disposed in the chip receiver, for conveying the chips gathered in the chip receiver to the outside of the machine.

According to a third feature of the present invention, there is provided a machine tool, for machining a workpiece by a relative displacement between the workpiece and a tool in the three axial directions X, Y, and Z, comprising: a bed forming a base; a column guided and movable leftward and rightward by a column-guide provided on a rear portion of the bed; a table, on which the workpiece is secured, which is guided and movable forward and rearward by a pair of opposed table-guides provided on a front portion of the bed; a horizontal type spindle head having a horizontally extending main spindle for mounting the tool, which is guided and movable up and down by a head-guide; a U-shaped chip receiver for chips provided under the table and extending in the table moving direction; two covers, each of which covers one of the pair of table-guides, for guiding and gathering chips into the chip receiver; and a chip discharger disposed in the chip receiver, for conveying the chips gathered in the chip receiver to the outside of the machine.

According to a fourth feature of the present invention, there is provided a machine tool, for machining a workpiece by a relative displacement between the workpiece and a tool in the three axial directions X, Y, and Z, comprising: a bed forming a base; a column guided and movable leftward and rightward by a column-guide provided on a rear portion of the bed; a table, on which the workpiece is secured, which is guided and movable forward and rearward by a pair of opposed table-guides provided on a front portion of the bed; a horizontal type spindle head having a horizontally extending main spindle for mounting the tool, which is guided and movable up and down by a head-guide; a splash guard for covering a machining zone for the workpiece, having a pair of opposed slopes in a lower part thereof for enhancing the movement of the chips; a U-shaped chip receiver for chips provided on a central portion of the bed under the table and extending in the forward/rearward direction; two pairs of extendable/retractable covers working in accordance with the displacement of the table, each pair covering one of the pair of table-guides to prevent the chips entering; and a chip discharger disposed in the chip receiver, for conveying to the outside of the machine the chips which have fallen down into the chip receiver.

According to the present invention, since the U-shaped chip receiver is provided beneath the table and extends in the table moving direction, chips generated during the machining of the workpiece reliably fall down directly or along the sloped cover portions into the chip receiver without disturbance. By means of the chip discharger disposed in the chip receiver, the chips are automatically conveyed to the outside of the machine without delay.

BRIEF DESCRIPTION OF THE DRAWINGS

These and other objects of the present invention will become apparent from the following detailed description of the preferred embodiments of the invention in connection with the accompanying drawings.

In the drawings.

DETAILED DESCRIPTION OF THE PREFERRED EMBODIMENTS

The present invention will be described below, in detail, with reference to the preferred embodiments.

Figure 1:
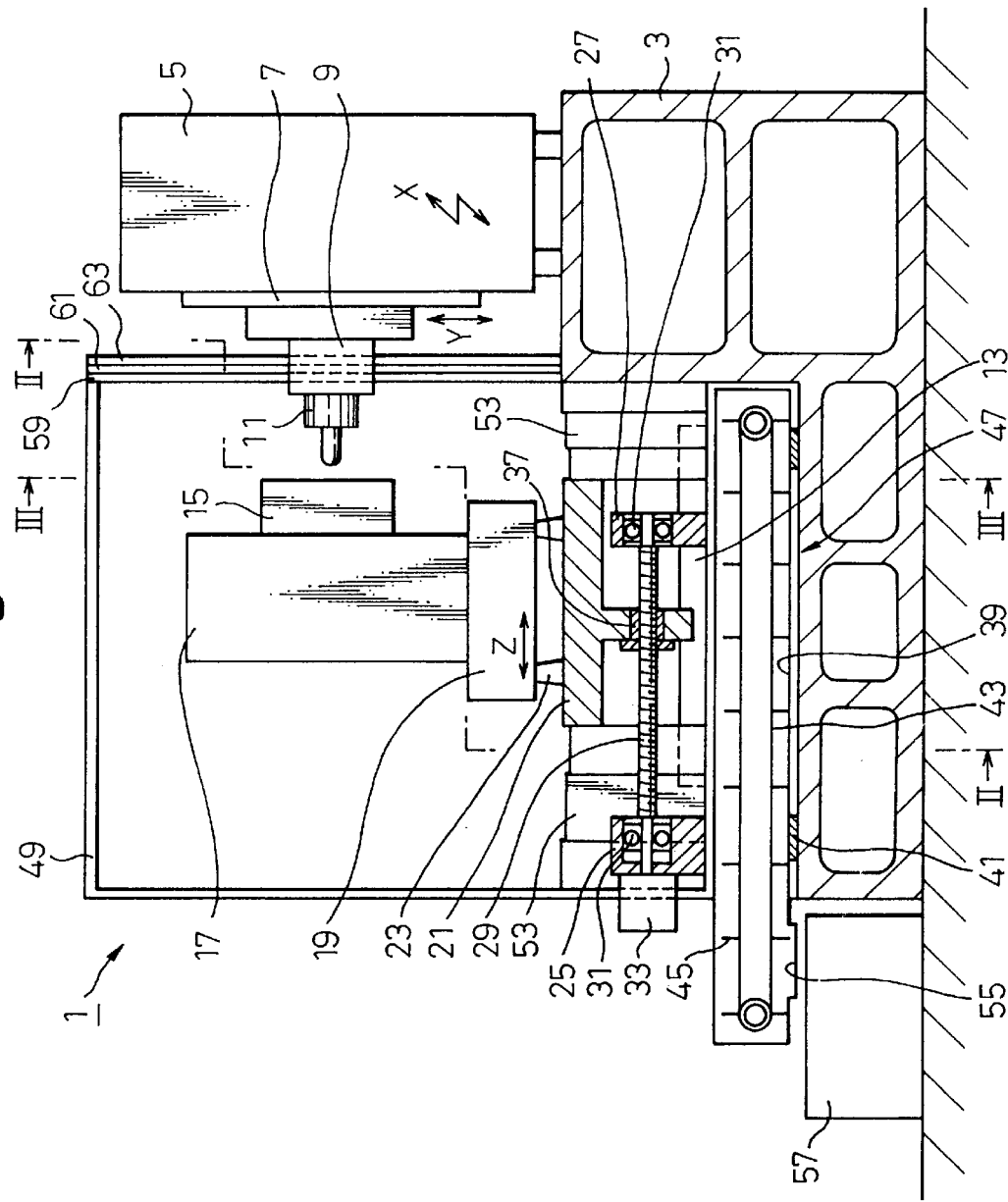
FIG. 1 is a side cross-sectional view taken along line I—I in FIG. 2, illustrating a horizontal type machining center according to a preferred embodiment of the machine tool of the present invention.

FIG. 1 is a side sectional view (taken along line I—I of FIG. 2) illustrating an overall structure of one embodiment of the present invention wherein a machine tool 1 is of a horizontal type for carrying out a desired machining operation on a workpiece by a relative displacement between the workpiece and a tool in the three axial directions X, Y and Z.

Figure 2:
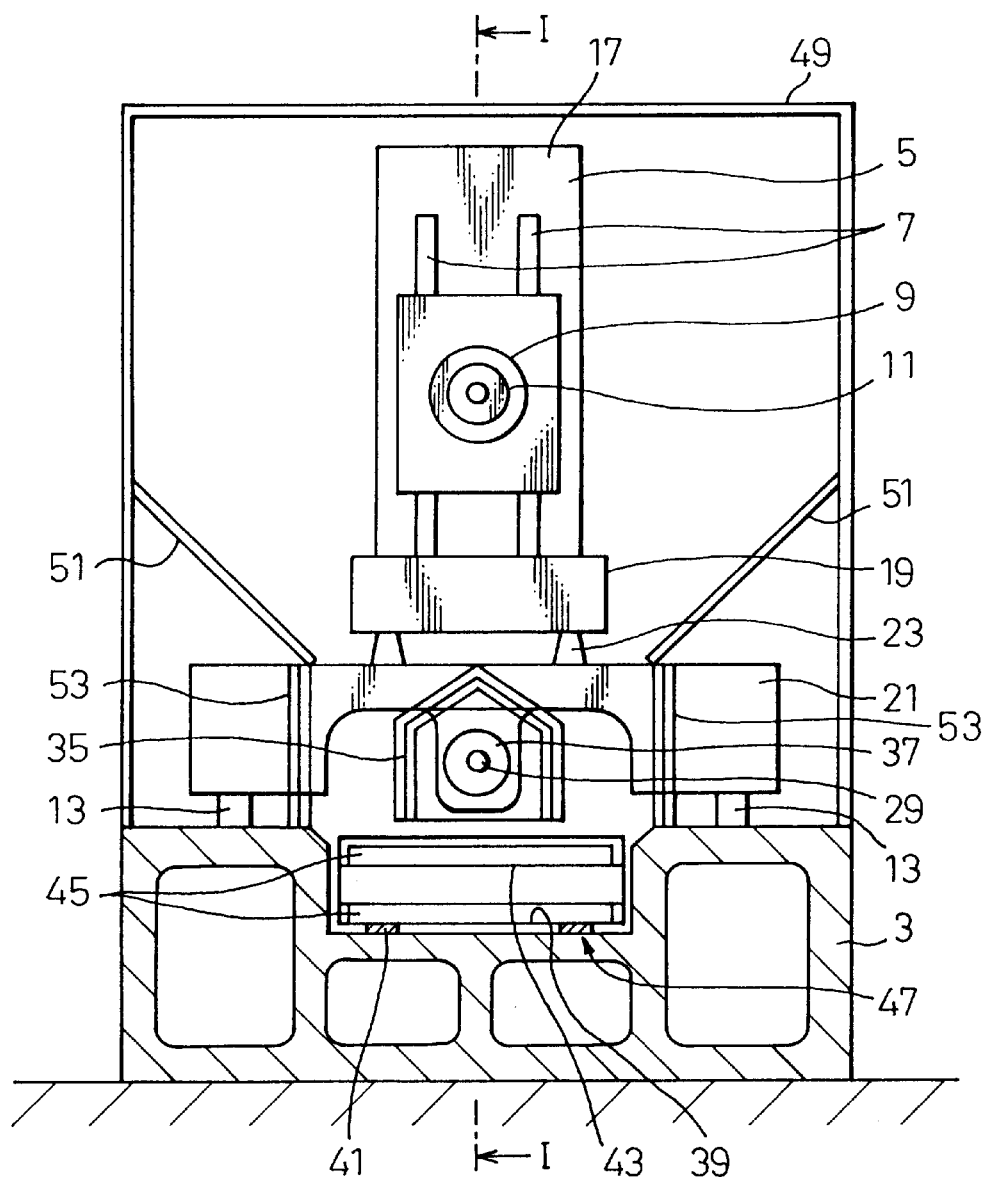
FIG. 2 is a frontal view, sectioned along line II—II in FIG. 1, of the horizontal type machining center.
Figure 3:
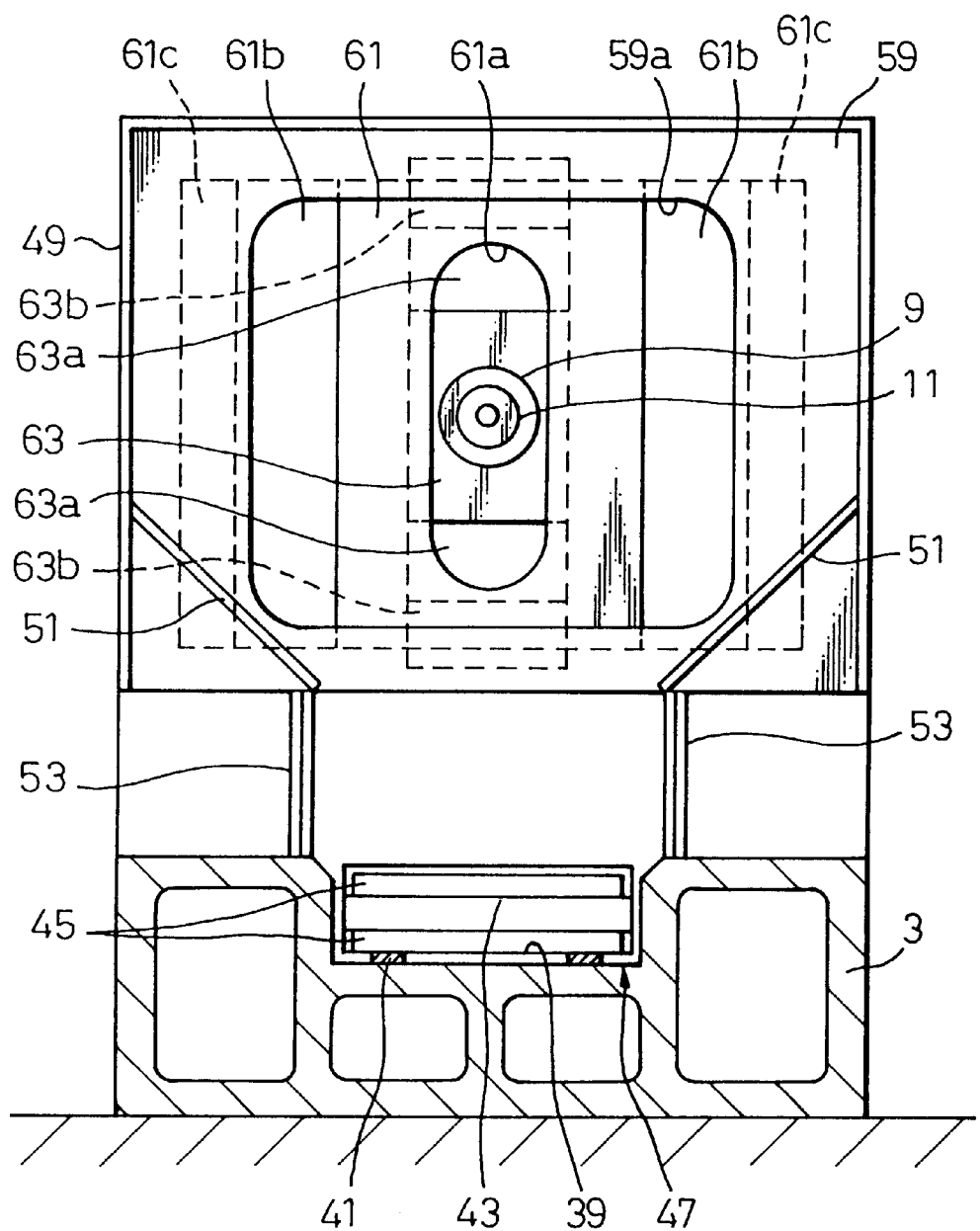
FIG. 3 is a frontal view, sectioned along line III—III in FIG. 1, of the horizontal type machining center.

FIG. 2 is a sectional view taken along line II—II of FIG. 1, and FIG. 3 is a sectional view taken along line III—III of FIG. 1.

In FIG. 1, a large size bed 3 having an L-shape, as a whole, with an elevated rear portion is formed by a box-like hollow structure supported by a plurality of ribs in the interior thereof for the purpose of weight reduction while maintaining a necessary rigidity and dimensional accuracy.

On a flat top of the rear portion of the bed 3, a pair of guide rails extend in the X direction, on which a column 5 is mounted to be movable in the X direction relative to the bed 3. On the front vertical surface of the column 5, a pair of guide rails 7, 7 extend in the Y direction, on which a spindle head 9 is mounted to be movable in the Y direction relative to the column 5. A tool is mounted to the spindle head 9, and a main spindle 11 is assembled to the spindle head 9 to be rotatable around an axis parallel to the Z axis.

A front portion of the bed 3 (i.e., a left side bed portion in FIG. 1) has a wide and horizontal flat surface. On both sides of the flat surface as seen from a front side of the machine (see FIGS. 2 and 3) is provided a pair of guide rails 13, 13 which extend parallel to each other along the Z direction. A table 13 is mounted on the guide rails 13 to be movable in the Z direction. Onto the table 21, a pallet 19 is detachably mounted via a pallet-positioning device 23. The pallet 19 carries an angle plate 17 on which a workpiece 15 is detachably mounted opposite to the tool.

As described, by means of the pallet-positioning device 23 interposed between the table 21 and the pallet 19, it is possible to automatically secure the pallet 19 in a predetermined position on the table 15 in a detachable manner by a pallet exchanger (not shown), while maintaining the workpiece 15 and the angle plate 17 on the pallet 19. In other words, it is possible to exchange a workpiece along with a pallet on which the former is mounted.

Of course, the angle plate 17 and the workpiece 15 are separately attachable and detachable.

On the top of the front portion of the bed 3, a pair of brackets 25 and 27 are provided in the Z direction in a central area thereof, between which a ball screw 29 extends in the Z direction and is rotatably supported by bearings 31, 31 fitted in the brackets 25, 27. To drive the ball screw 29, a Z-axis feed motor 33 is provided in front of the bracket 25 which is closer to the front side of the bed 3.

On the bottom side of the table 21 is provided a nut bracket, into which a feed-screw nut 37 is fitted. The feed-screw nut 37 and the ball screw 29 extending through the former form a Z-axis feed means for driving the table 21.

By driving the Z-axis motor 33 in a controlled manner, it is possible to control the Z-axial feeding of the table 21 on the bed 3, and then, the Z-axial position of the workpiece 15 relative to the main spindle 11.

With reference to FIG. 2, a movable, so-called telescopic cover 35 is provided for covering upper and lateral sides of the ball screw 29, having an inverse U-shaped cross-section with an open lower side, in order to protect from chips the feed screw means, which is exposed when the table moves in the Z direction. This open type telescopic cover 35 is composed of a plurality of U-shaped plates partially overlapping one another and is extendable or contractible in the Z direction with almost no gaps between the plates.

When the bed 3 is seen from the front side, a channel (or U-shaped chip receiver) 39 is provided via seats 41 in a recess formed on the top of the front portion of the bed 3 between the pair of Z-axial guide rails 13, 13. The channel 39 has a width and a depth sufficient to accommodate a chip discharger (or chip-removal means).

In this regard, a front end of the channel 39 does not exceed a stepped rear side part of the bed 3 (see FIG. 1).

The chip discharger is accommodated within a bottom of the channel 39, which is constituted by a chip conveyor 47 comprising a pair of sprockets positioned at front and rear ends thereof, an endless chain 43 wrapped around both the sprockets, and a plurality of scrapers 45 oriented in the X direction and arranged at a generally equal pitch along the chain 43. The scrapers 45 are shaped so as to close a gap formed between the bottom of the channel 39 and the chain 43.

The seats 41 for isolating the channel 39 from the bed 3 create a gap for preventing heat in the chips, a coolant, and the like transported by the chip conveyor 47 from being conducted to the bed 3, thereby preventing generating of the thermal expansion strain therein during the transportation.

A width of the channel 39 is generally equal to a distance between telescopic covers 53 and 53 contiguous to the lower edges of a pair of opposite slopes 51 and 51 attached to both sides of a splash guard 49 described later. The channel 39 extends from a position in front of the rear portion of the bed 3 to a position exceeding the front end of the bed 3, and has a chip-discharging opening 55 on the lower side of the front end thereof.

The channel 39 extends all over the area for receiving all chips to be guided and collected by the slopes 51 and the telescopic covers 35, and the chip conveyor 47 is driven to rotate clockwise (see FIG. 1) to transport the collected chips on the conveyor 47 to the chip-discharging opening 55. A coolant tank 57 is located beneath the chip-discharging opening 55 to receive the chips falling down from the opening 55 together with the coolant.

The telescopic covers 53, 53 are a movable cover used for covering spaces between the rear stepped portion of the bed 3 and the table 21 and between the table 21 and a front side plate of the splash guard 49 described later to protect a slide surface of the table 21 from the chips of the workpiece, i.e., the Z-axial guide rails 13, 13 for the bed 3 and to guide the chips falling down onto the slope 51 to the chip conveyor 47.

With reference to FIGS. 1, 2 and 3, the splash guard 49 serves to cover the machining zone of the workpiece 15, prevent the coolant and/or chips from splashing outside, and protect the operator from danger due to the rotation of tool and the scattering of chips.

The slopes 51, 51 described above are attached to the lower portion of both lateral side walls of the splash guard 49 to prevent the chips and/or the coolant from falling down on the Z-axial guide rails 13, 13 of the bed 3. By increasing the inclination angle of the slopes 51, 51, the dwelling of chips on the slope can be eliminated.

A portion of the rear side wall of the splash guard 49 through which the spindle head 9 extends has a triple-layered window structure consisting of an XY cover 59, an X cover 61 and a Y cover 63.

With reference to FIG. 3, the XY cover 59 is fixed to a rear side wall of the splash guard 49 (constituting a part of a main body of the splash guard 49), and has a generally rectangular through-hole 59*a*. Behind the XY cover 59 (on a rear surface as seen from the front side of the machine), the X cover 61 is provided to cover a central portion of the through-hole 59*a*, and has an elongated through-hole 61*a*. Behind the X cover 61, the Y cover 63 is provided to cover a central portion of the through-hole 61*a*, and is penetrated by the spindle head 9 at a center thereof.

Between each of left/right ends of the X cover 61 and each of stationary plates 61*c*, 61*c*, each of movable covers 61*b*, 61*b* such as a bellows or a telescopic cover is attached. Similarly, between each of upper/lower ends of the Y cover 63 and each of stationary plates 63*b*, 63*b*, each of movable covers 63*a*, 63*a* is attached.

Thus, the through-hole 59*a* defining a movable range of the spindle head 9 in the X direction is always covered with the X cover 61 and the movable covers 61*b*, 61*b*. The through-hole 61*a* defining a movable range of the spindle head 9 in the Y direction is always covered with the Y cover 63 and the movable cover 63*a*, 63*a*. Therefore, the spindle head 9 is engaged in the relative movement in the X and Y directions with no interference of the outer circumference of the spindle head 9 with the inner peripheral edge of the through-holes 59*a*, 61*a*.

According to such an arrangement, the spindle head 9 is movable in the X and Y directions within the through-hole 59*a* of the XY cover 59. For this purpose, it is sufficient to form the through-hole 59*a* to have a minimum size for the movable range of the spindle head 9 in the X and Y directions. Also, if forming four corners of the through-hole in round shapes, the size thereof may be further reduced. This results in the possibility of increase in the inclination angle of the slopes 51, 51 to further facilitate the prevention of heaping of chips. In this regard, since the XY cover 59, X cover 61, and Y cover 63 are of a thin plate-shape, the chips hardly heap up on the inner peripheral edges of the through-holes 59*a* and 61*a*.

Figure 4:
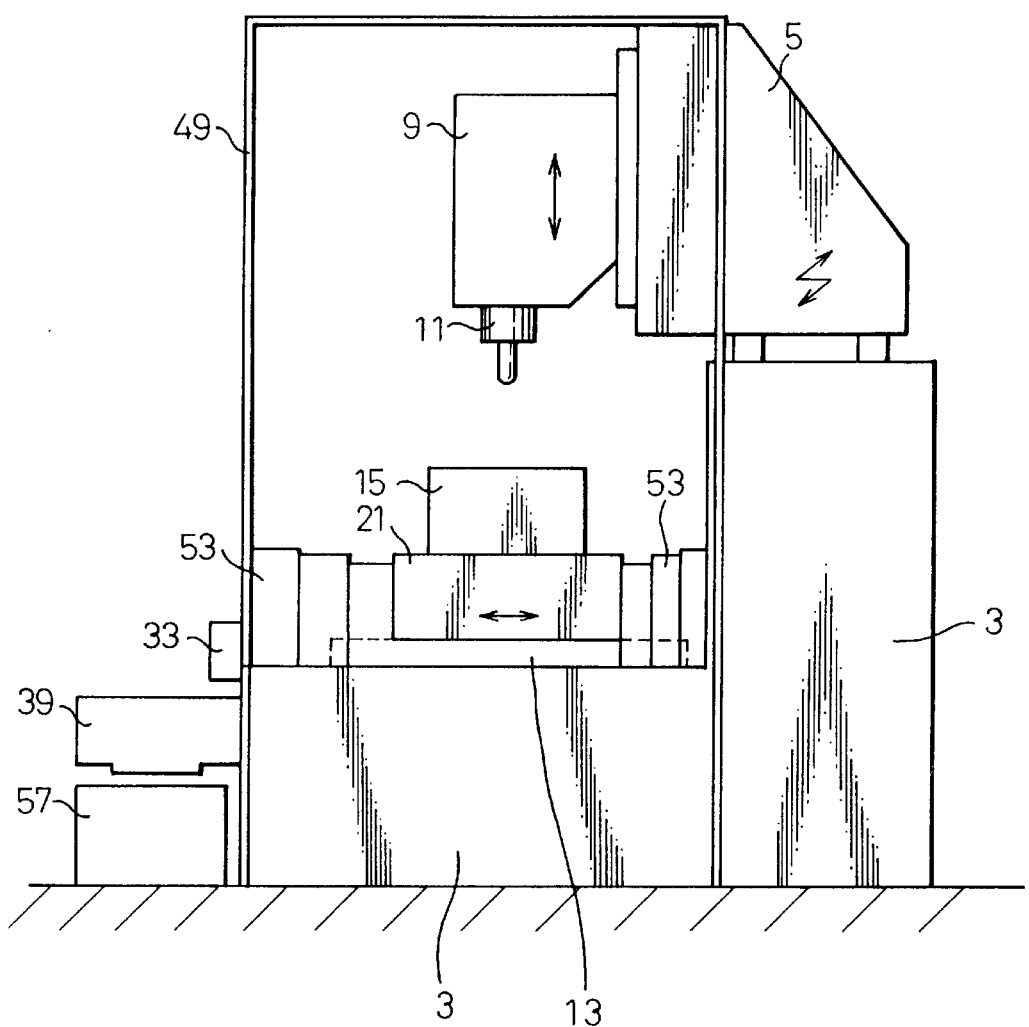
FIG. 4 is a side view, in partly sectioned, illustrating a vertical type machining center.

Referring now to FIG. 4, a supplemental embodiment of a vertical type machining center will be described, in which the same reference numerals are used for designating the same or similar parts to those in the horizontal machining center described and illustrated in FIG. 1.

On the top of a front portion of an L-shaped bed 3 beneath a table 21 of the vertical type machining center is provided a channel 39 incorporating a chip discharger therein, the channel 39 being arranged in the left/right directions as seen in the drawing so that a chip-discharging opening of the chip discharger is positioned at a front end of the bed 3. Also, a drive means for the forward/rearward displacement of the table 21 is provided at the front end of the bed 3. Regarding slopes, telescopic covers or others for collecting chips, the explanation thereof will be eliminated herein but is substantially the same as in the above-described horizontal machining center.

In this way, it is possible to apply to a vertical type machining center the same technical means as those of the horizontal type machining center, and the operation and effect derived therefrom are also the same as in the horizontal type machining center described above.

In the above described embodiments of the present inventions, various effects which could not be expected by the conventional devices are achievable; in that, since the splash guard having slopes and the telescopic cover extensible and contractible in the horizontal direction are provided, the chips are prevented from entering a gap between cover members; since the chips are discharged from the front side of the machine, it is unnecessary to provide a through-hole in the interior of the back side of the bed, whereby the desired rigidity can be maintained in the bed; since the feed means for feeding the table in the forward/rearward directions, such as a ball screw or a drive motor is provided in the front portion of the machine, it is unnecessary to provide a through-hole in the interior of the back side of the bed, whereby the desired rigidity can be maintained in the bed.

As described above, according to the present invention, since the U-shaped chip receiver is provided beneath the table and extends in the table moving direction, chips generated during the machining of the workpiece reliably fall down directly or along the sloped cover portions into the chip receiver without disturbance.

Especially, in horizontal type machining center, almost of all chips may fall down through the open space between the table and the column.

Further, by means of the chip discharger provided in the channel, the chips may be automatically discharged outside of the machine. To achieve the intended objectives, it is sufficient to provide a single wide channel beneath the table, and, as a result thereof, a reasonable machining center which is small in size and simple in structure can be obtained.

It is to be understood that the present invention is by no means limited to the specific embodiments as illustrated and described herein, and that various modifications thereof may be made which come within the scope of the present invention as defined in the appended claims.

What is claimed is:

1. A machine tool, for machining a workpiece by a relative displacement between the workpiece and a tool in three axial directions X, Y, and Z, comprising:

a bed forming a base;

a table, on which the workpiece is secured, which is guided and movable on the bed in at least a horizontal direction by a pair of opposed table-guides;

a spindle head having a main spindle for mounting the tool, which is relatively movable with respect to the table;

a U-shaped chip receiver forming a center trough for chips provided under the table and extending in the table moving direction;

two covers, each of which covers one table-guide for the pair of opposed table guides, for guiding and gathering chips into the chip receiver; and an adjustable cover composed of partially overlapping, relatively movable cover plates and defining a rear surface of a splash guard opposed to a frontal surface of a movable column, wherein said adjustable cover has a through-hole through which the spindle head or the movable column extends into the machining zone inside the splash guard, said through-hole being able to change its position so as to follow the movement of the spindle head in leftward and rightward directions or in upward and downward directions.

2. A machine tool, for machining a workpiece by a relative displacement between the workpiece and a tool in three axial directions X, Y, and Z, comprising:

a bed forming a base;

a table, on which the workpiece is secured, which is guided and movable on the bed in at least a horizontal direction by a pair of opposed table-guides;

a horizontal type spindle head having a horizontally extending main spindle for mounting the tool, which is relatively movable with respect to the table;

a U-shaped chip receiver forming a center trough for chips provided under the table and extending in the table moving direction;

two covers, each of which covers one table-guide for the pair of opposed table-guides, for guiding and gathering chips into the chip receiver;

a chip discharger disposed in the chip receiver, for conveying the chips gathered in the chip receiver outside of the machine; and an adjustable cover composed of partially overlapping, relatively movable cover plates and defining a rear surface of a splash guard opposed to a frontal surface of a movable column, wherein said adjustable cover has a through-hole through which the spindle head or the movable column extends into the machining zone inside the splash guard, said through-hole being able to change its position so as to follow the movement of the spindle head in leftward and rightward directions or in upward and downward directions.

3. A machine tool, for machining a workpiece by a relative displacement between the workpiece and a tool in three axial directions X, Y, and Z, comprising:

a bed forming a base;

a column guided and movable leftward and rightward by a column-guide provided on a rear portion of the bed;

a table, on which the workpiece is secured, which is guided and movable forward and rearward by a pair of opposed table-guides provided on a front portion of the bed;

a horizontal type spindle head having a horizontally extending main spindle for mounting the tool, which is guided and movable up and down by a head-guide;

a U-shaped chip receiver forming a center trough for chips provided directly under the table and extending in the table moving direction;

two covers, each of which covers one table-guide for the pair of opposed table-guides, for guiding and gathering chips in to the chip receiver;

a chip discharger disposed in the chip receiver, for conveying the chips gathered in the chip receiver outside of the machine; and an adjustable cover comprising partially overlapping, relatively movable cover plates and defining a rear surface of the splash guard opposed to a frontal surface of the column, wherein said adjustable cover has a through-hole through which the spindle head extends from the frontal surface of the column into the machining zone inside the splash guard, said through-hole being able to change its position so as to follow the movement of the spindle head in a leftward and rightward direction and in an upward and downward direction.

4. A machine tool, for machining a workpiece by a relative displacement between the workpiece and a tool in three axial directions X, Y, and Z, comprising:

a bed forming a base;

a column guided and movable leftward and rightward by a column-guide provided on a rear portion of the bed;

a table, on which the workpiece is secured, which is guided and moveable forward and rearward by a pair of opposed table-guides provided on a front portion of the bed;

a horizontal type spindle head having a horizontally extending main spindle for mounting the tool, which is guided and movable up and down by a head-guide;

a splash guard for covering a machining zone for the workpiece, having a pair of opposed slopes in a lower part thereof for enhancing the movement of the chips;

a U-shaped chip receiver for the chips provided on a central portion of the bed under the table and extending in a forward and rearward direction;

two pairs of extendable/retractable covers working in accordance with the displacement of the table, each pair of which covers one table-guide for the pair of opposed table-guides to prevent the chips entering;

a chip discharger disposed in the chip receiver, for conveying to the outside of the machine the chips which have fallen down into the chip receiver; and an adjustable cover comprising partially overlapping, relatively movable cover plates and defining a rear surface of the splash guard opposed to a frontal surface of the column, wherein said adjustable cover has a through-hole through which the spindle head extends from the frontal surface of the column into the machining zone inside the splash guard, said through-hole being able to change its position so as to follow the movement of the spindle head in a leftward and rightward direction and in an upward and downward direction.

5. The machine tool according to claim 4, including a table feeder for moving the table in the forward and rearward direction provided in front of the table, and wherein said chip discharger may discharge the chips through a front side outlet of the chip receiver.

6. The machine tool according to claim 1, wherein the column is guided by a column guide on a rear portion of the bed.

7. The machine tool according to claim 4, wherein said cover plates are composed of a stationary cover plate, an X cover plate, and a Y cover plate which are put one on another in this order; the stationary cover plate being fixed to a rear side wall of the splash guard for covering an interface between the machining zone and the column; the X cover plate being provided behind the stationary cover plate to be movable in the leftward and rightward direction together with the spindle head; and the Y cover plate being provided behind the X cover plate to be movable in the upward and downward direction together with the spindle head.

8. The machine tool according to claim 4, wherein said chip receiver is made of a thin sheet member and fixed to the bed at several points with a certain clearance between the chip receiver and the bed.

9. The machine tool according to claim 1, including a chip discharger disposed in the chip receiver, for conveying the chips gathered in the chip receiver to the outside of the machine.

10. The machine tool according to claim 1, including a column guided and movable leftward and rightward by a column-guide provided on a rear portion of the bed.

11. The machine tool according to claim 1, wherein the spindle head is a horizontal type spindle head and the main spindle is a horizontally extending main spindle for mounting the tool which is guided and movable up and down by a head guide.

12. The machine tool according to including claim 1, wherein the opposed table-guides guide and move the table forward and rearward and are provided on a front portion of the bed.

13. The machine tool according to claim 1, including a splash guard for covering a machining zone for the workpiece, having a pair of opposed slopes in a lower part thereof for enhancing the movement of the chips.

14. The machine tool according to claim 1, including two pairs of extendable and retractable covers working in accordance with the displacement of the table, each pair of which covers one table-guide for the pair of opposed table-guides to prevent the chips entering.

15. The machine tool according to claim 1, wherein the U-shaped chip receiver for the chips is provided on a central portion of the bed under the table and extending in forward and rearward direction of the table.

16. The machine tool according to claim 2, wherein a table feeder for moving the table in a forward and rearward direction is provided in front of the table, and wherein said chip discharger may discharge the chips thorough a front side outlet of the chip receiver.

17. A machine tool according to claim 1 further comprising a pair of slopes, each of which are disposed above each of said covers for covering the pair of opposed table guides, for guiding the chips into the center trough.

18. The machine tool according to claim 1, wherein said cover plates are composed of a stationary cover plate, an X cover plate, and a Y cover plate which are put one on another in this order; the stationary cover plate being fixed to a rear side wall of the splash guard for covering an interface between the machining zone and the column; the X cover plate being provided behind the stationary cover plate to be movable in the leftward and rightward directions together with the spindle head; and the Y cover plate being provided behind the X cover plate to be movable in the upward and downward direction together with the spindle head.

19. The machine tool according to claim 1, wherein said chip receiver is made of a thin sheet member and fixed to the bed at several points with a certain clearance between the chip receiver and the bed.

20. The machine tool according to claim 2, wherein said chip receiver is made of a thin sheet member and fixed to the bed at several points with a certain clearance between the chip receiver and the bed.

21. The machine tool according to claim 2, wherein said cover plates are composed of a stationary cover plate, an X cover plate, and a Y cover plate which are put one on another in this order; the stationary cover plate being fixed to a rear side wall of the splash guard for covering an interface between the machining zone and the column; the X cover plate being provided behind the stationary cover plate to be movable in the leftward and rightward directions together with the spindle head; and the Y cover plate being provided behind the X cover plate to be movable in the upward and downward direction together with the spindle head.

22. A machine tool according to claim 1 further comprising means for driving the table along the pair of opposed table guides, the driving means including a ball screw extending parallel to the table guides, a screw nut, secured to the table, for engaging the ball screw, and a motor, connected to the front end of the ball screw, for rotating the ball screw to control the movement of the table.

23. A machine tool according to claim 1, further, wherein the U-shaped chip remover comprises a chip conveyer extending parallel to the table guides and including a pair of sprockets positioned at the front and rear ends of the chip conveyer, an endless chain wrapped around both the sprockets, and a plurality of scrapers, oriented substantially perpendicular to the table guides and arranged at a generally equal pitch along the chain.

24. A machine tool according to claim 23, wherein the chip remover is adapted to move the chips disposed in the center through toward the front end of the chip remover.

25. A machine tool according to claim 1, wherein the adjustable cover is not movable in the direction parallel to the table guides to define the rear surface of the splash guard.

* * * * *